UNITED STATES PATENT OFFICE.

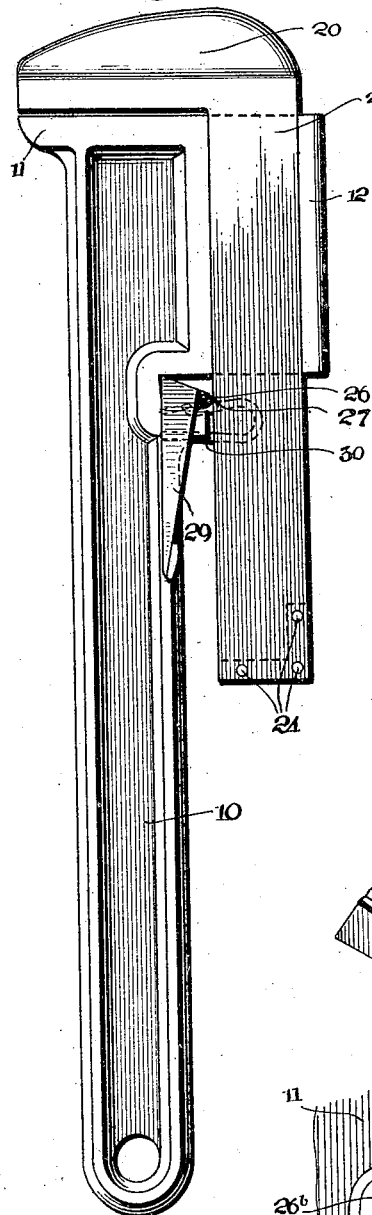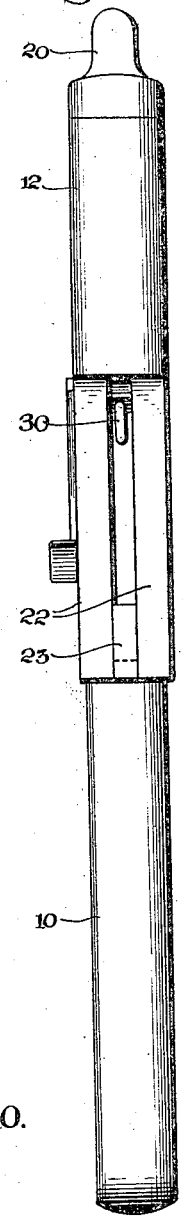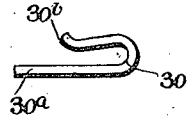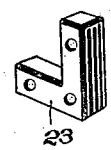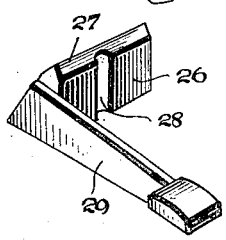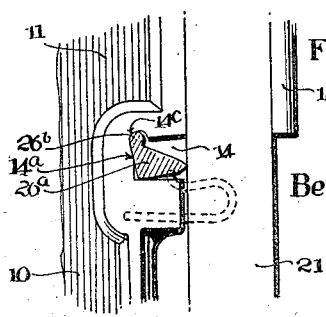
INVENTOR
Benjamin G. Patterson,
ATTORNEYS B. G. PATTERSON.
WRENCH.
APPLICATION FILED NOV. 24, 1920.
1,402,249.
Patented Jan. 3, 1922.
2 SHEETS—SHEET 2.
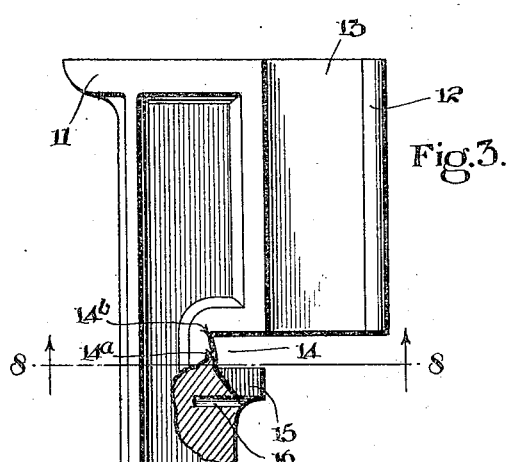
Fig. 3.
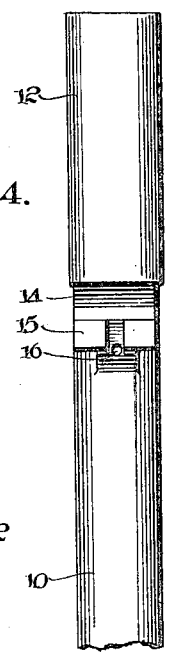
Fig. 4.
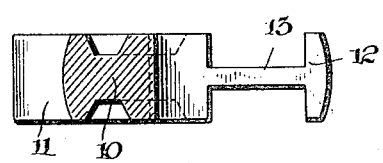
Fig. 8.
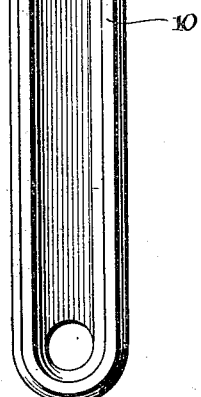
Fig. 9.
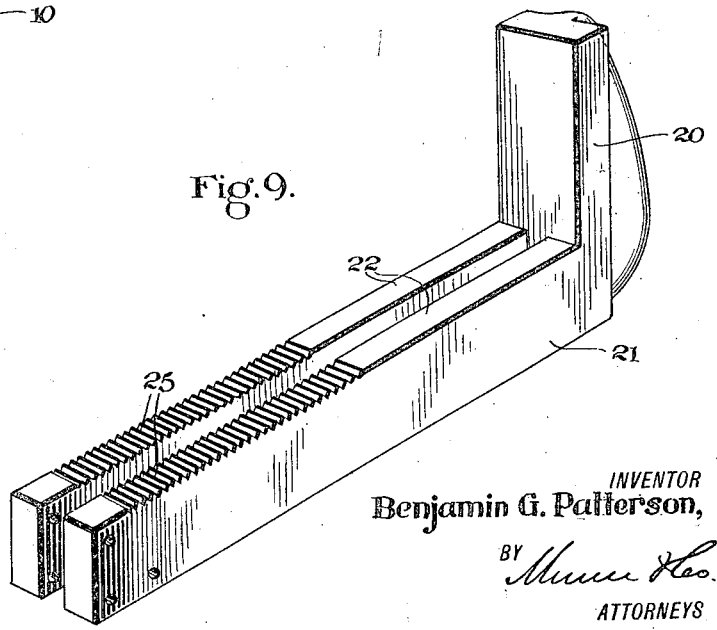
WITNESSES
R. E. Rousseau
W. H. Buckley.
INVENTOR
Benjamin G. Patterson,
BY
ATTORNEYS

BENJAMIN GILBERT PATTERSON, OF OKLAHOMA, OKLAHOMA.

WRENCH.

1,402,249.  Specification of Letters Patent.  Patented Jan. 3, 1922.

Application filed November 24, 1920. Serial No. 426,255.

*To all whom it may concern:*

Be it known that I, BENJAMIN GILBERT PATTERSON, a citizen of the United States, and a resident of Oklahoma city, in the county of Oklahoma and State of Oklahoma, have invented certain new and useful Improvements in Wrenches, of which the following is a specification.

The present invention relates to improvements in wrenches, and has for its object to provide an improvement of this character which is quickly adjustable to operate upon various objects, which is self locking, which may be readily released with the thumb of one hand and which is of simple and durable construction, reliable in operation and simple and inexpensive to manufacture.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a side elevational view of the wrench;

Figure 2 is a rear end elevational view;

Figure 3 is a detail view in side elevation of the inner jaw, parts being broken away for the sake of illustration;

Figure 4 is a fragmentary detail view in rear elevational of the inner jaw;

Figure 5 is a detail view in side elevation of the spring;

Figure 6 is a detail perspective view of the stop of the inner jaw;

Figure 7 is a detail view of the locking cam and operating lever thereof;

Figure 8 is a detail view in section, taken on line 8—8 of Figure 2 and looking in the direction of the arrow; and Figure 9 is a detail perspective view of a slightly modified form of outer jaw; and Figure 10 is a fragmentary view, in side elevation, of a slightly modified form.

Referring to the drawings wherein for the sake of illustration is shown the preferred embodiment of the invention, the numeral 10 designates the handle of the wrench. An inner jaw 11 is integrally formed with the handle 10 whereby the handle constitutes also the shank of the inner jaw. A guide frame 12 is integrally formed or otherwise secured to the inner jaw 11, and as clearly shown in Figures 3 and 8, its opposite side faces are provided with channels 13. Intermediate the shank or handle 10 and the inner jaw 11 there is provided a recess 14 which is defined by the adjacent portions of the inner jaw and shank and by a lug 15 provided at the upper end of the handle or shank 10. Immediately below the lug the shank is provided with a transverse bore 16.

An outer jaw 20 has integrally formed therewith a shank 21 which consists of spaced parallel bars 22 slidably received in the channels 13 of the guide frame 12. After the wrench has been assembled, an angle stop 23 is inserted between the lower end of the parallel bars and secured in position by means of pins 24. The angle stop serves to limit the outward movement of the outer jaw relative to the inner jaw. The faces of the parallel bars adjacent the inner jaw and the shank are formed to constitute friction faces. If desired, these faces may be provided with serrations 25, shown in Figure 9 to enhance the frictional action or to provide a positive locking action as will be more fully described.

Means is provided for releasably locking the outer jaw in any position to which it may be adjusted with respect to the inner jaw and includes a locking cam 26 of general triangular form or cross section and having a knife edge 27, and a rounded groove 28 in one face. The locking cam 26 is arranged in the recess 14. As shown in the drawings the general triangular form of the locking cam is preferably scalene having one corner of its base acute-angled and the other corner thereof right-angled. The recess 14 in which the locking cam is received has its inner or bottom wall formed so as to describe an obtuse angle in cross section, the apex of the angle constituting a fulcrum designated at 14$^a$ and upon which the base of the locking cam rocks. The surface of the bottom or inner wall of the recess extending from the fulcrum 14$^a$ to the upper corner thereof has a relatively sharp inward inclination to accommodate the locking cam in its action and to provide a second fulcrum designated at 14$^b$ for the adjacent corner of the locking pin. A thumb lever 29 is integral with or otherwise secured to the locking cam and serves to operate the same.

A bowed spring 30 is provided and is accommodated in the space between the parallel bars. One leg of the spring is straight, as indicated at 30ª and is received in the bore 16 so as to be seated in the inner jaw. The other leg of the bowed spring is offset at its extremity, as shown at 30ᵇ and operates in the rounded groove 28 of the locking cam. The spring is constructed so that when it is assembled, as shown in Figure 1, it is normally under tension and tends to throw the knife edge of the locking cam into engagement with the friction face of the shank of the outer jaw, that is, it biases the locking cam to locking position. The engagement of the knife edge 27 with the friction face is usually found to be sufficient to securely lock the jaws in adjusted position but for some classes of work where it is desired to have a more positive action the shank with the serrations 25 is used and in this instance, the knife edge 27 being received by the serrations positively locks the jaws in adjusted position.

In practice, the shank or handle 10 of the wrench is grasped by the hand, usually the right hand, and the thumb of the hand with which the handle is grasped is utilized to depress the thumb lever 29. This rocks the locking cam about its fulcrum 14ª against the tension and action of the bowed spring 30, whereby the knife edge 27 is moved away from and out of engagement with the friction face of the shank of the outer jaw. This permits quick and easy adjustment of the jaws to receive and engage the object to be operated upon. After this adjustment the thumb lever is released and the spring 30 then throws the knife edge of the locking cam into engagement with the friction face of the shank of the outer jaw and locks the jaws in adjusted position. In moving into locking position the locking cam in the first instance operates mainly and almost entirely upon the fulcrum 14ª. When the knife edge of the locking cam enters into complete locking engagement with the friction face the acute angled corner of the base of the locking cam operatively bears upon the second fulcrum 14ᵇ to effectively constrain the locking cam to proper locking action.

The modification shown in Figure 10 is identical with the form of the invention as described in so far as the jaws, shanks, guide frame, bowed spring, etc., is concerned. The recess 14 however in this form is provided in its upper corner with a semi-circular or semi-cylindrical extension, designated at 14ᶜ which receives a similar shaped extension designated at 26ᵇ of the locking cam which in this form of the invention is designated at 26ª. In this manner the second bearing or fulcrum of the locking cam is more complete and more positive in its effect as the locking cam is positively constrained to operate upon the fulcrum 14 and the fulcrum defined by the extension 14ᶜ of the recess. The locking cam is otherwise identical with the locking cam of the form as described in so far as general triangular form, knife edge, rounded groove and thumb-operated lever is concerned.

I claim:

1. In a wrench of the character described, an inner jaw having an integral shank constituting the handle of the wrench, and a channeled guide frame, an outer jaw having an integral shank comprising spaced parallel bars slidably received in the channels of said guide frame, said bars having a friction face, said inner jaw having a recess adjacent said friction face, and means for releasably locking said jaws together in adjusted position including a locking cam of triangular form arranged in said recess and having a corner fulcrumed in a corner of said recess, a knife edge engageable with the friction face of the outer jaw and a rounded groove in one of the sides, a thumb lever for operating said locking cam, and a bowed spring accommodated in the space between said parallel bars and having one end seated in said inner jaw and the opposite end offset and operating in the rounded groove of said locking cam.

2. In a wrench of the character described, an inner jaw having a shank and provided with a recess, an outer jaw having a shank provided with a friction face and means for releasably locking said jaws together in adjusted position including a locking cam of triangular form arranged in said recess and having a corner fulcrumed in a corner of said recess, a knife edge engageable with the frictional face of the outer jaw and rounded groove in one of its sides, a thumb lever for operating said locking cam and a bowed spring having one end seated in said inner jaw and the opposite end offset and operating in the round groove of said locking cam.

3. In a wrench of the character described, coacting jaws, one of said jaws having a recess and the other of said jaws having a friction face, and means for releasably locking said jaws together in adjusted position including a locking cam of triangular form arranged in said recess and having a corner fulcrumed in a corner of said recess, a knife edge engageable with the frictional face of the outer jaw and rounded groove in one of its sides, a thumb lever for operating said locking cam, and a bowed spring having one end seated in said inner jaw and the opposite end offset and operating in the round groove of said locking cam.

4. In a wrench of the character described, coacting jaws and means for releasably locking said jaws in adjusted position including a locking cam carried by one of said jaws and having a knife edge engageable with the other of said jaws and a rounded groove in one of its sides, a thumb lever for operating said locking cam and a bowed spring having one end seated in one of said jaws and the opposite end offset and operated in the rounded groove of said locking cam.

5. In a wrench of the character described, an inner jaw having a shank provided with a recess having a semi-cylindrical extension, an outer jaw having its shank provided with a friction face and means for releasably locking said jaws together in adjusted position including a locking cam having a semi-cylindrical extension constituting its fulcrum and arranged in the semi-cylindrical recess, a knife edge adapted to engage the friction face, and a rounded groove in one of its sides, a thumb lever for operating said locking cam and a bowed spring seated in the shank of said inner jaw and having an offset operating in the rounded groove of the locking cam.

6. In a wrench of the character described, coacting jaws and means for releasably locking said jaws together in adjusted position including a locking cam having a double fulcrum on one of said jaws and a knife edge engageable with the other of said jaws, and a spring for urging said locking cam into locking position.

7. In a wrench of the character described, coacting jaws, one of said jaws having a recess provided with a base formed as an obtuse angle, the apex of the angle constituting a fulcrum, a locking cam of scalene triangular form having its base adapted to rock upon the fulcrum constituted by the apex and having one corner of its base adapted to bear upon the fulcrum constituted by the upper corner of said recess when said locking cam is in complete locking position.

8. In a wrench of the character described, coacting jaws and means for releasably locking said jaws together in adjusted position including a locking cam having a double fulcrum on one of said jaws and a knife edge engageable with the other of said jaws.

9. In a wrench of the character described, coacting jaws, one of said jaws having a recess provided with a base formed on an angle, the apex of the angle constituting a fulcrum, a locking cam adapted to rock upon the fulcrum constituted by the apex and having one corner of its base adapted to bear upon the fulcrum constituted by the adjacent corner of the recess.

BENJAMIN GILBERT PATTERSON.